United States Patent Office 3,298,757
Patented Jan. 17, 1967

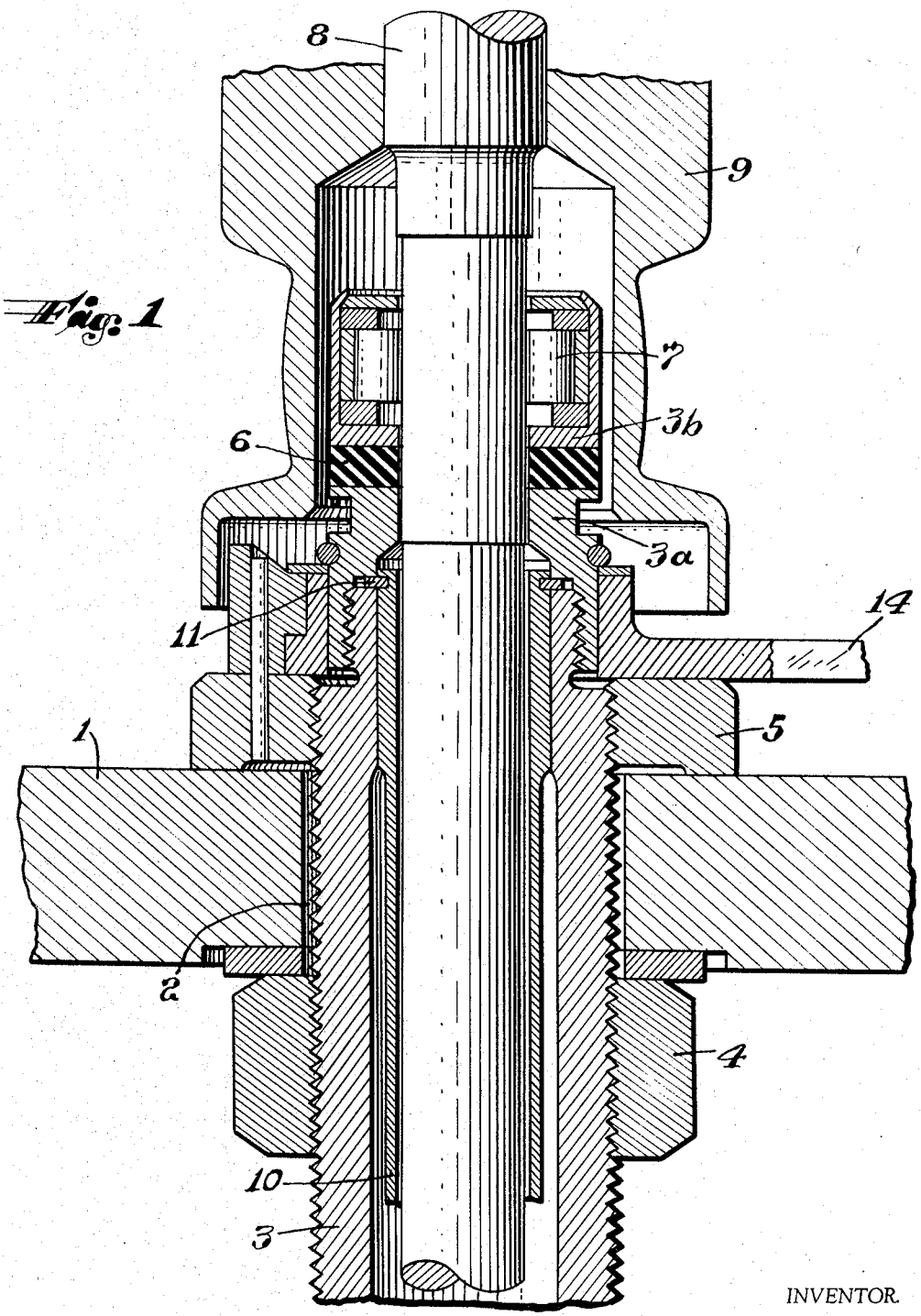

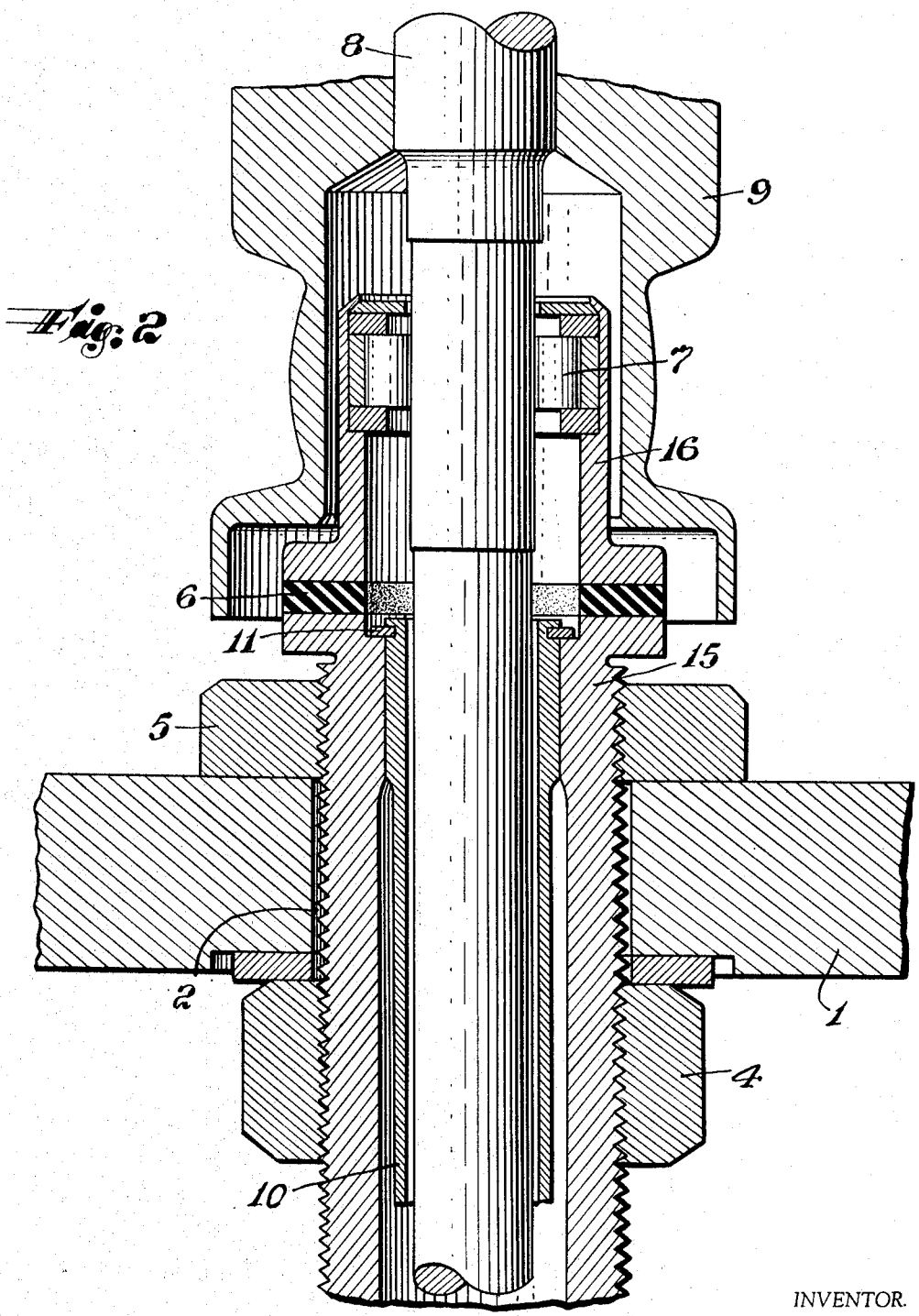

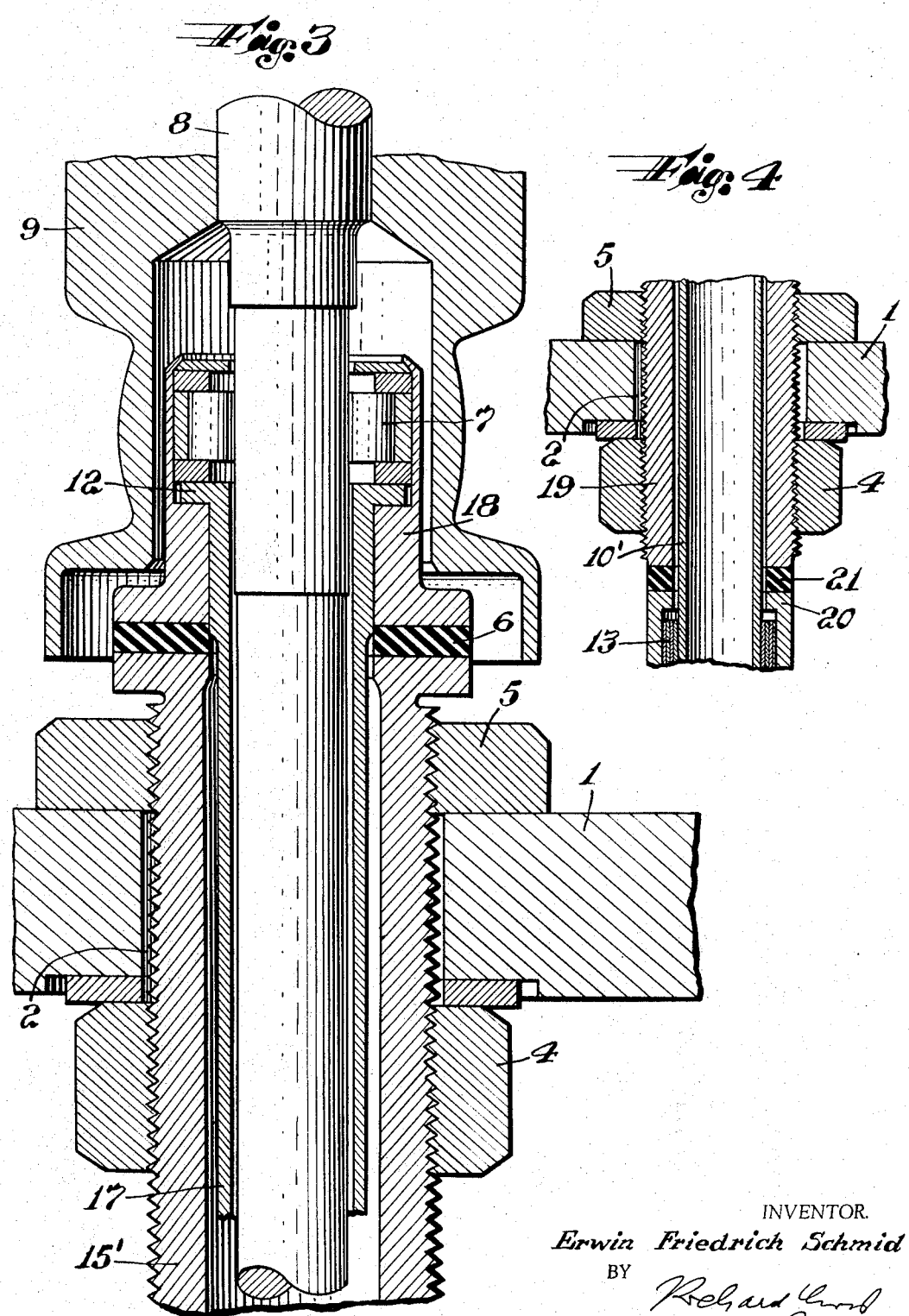

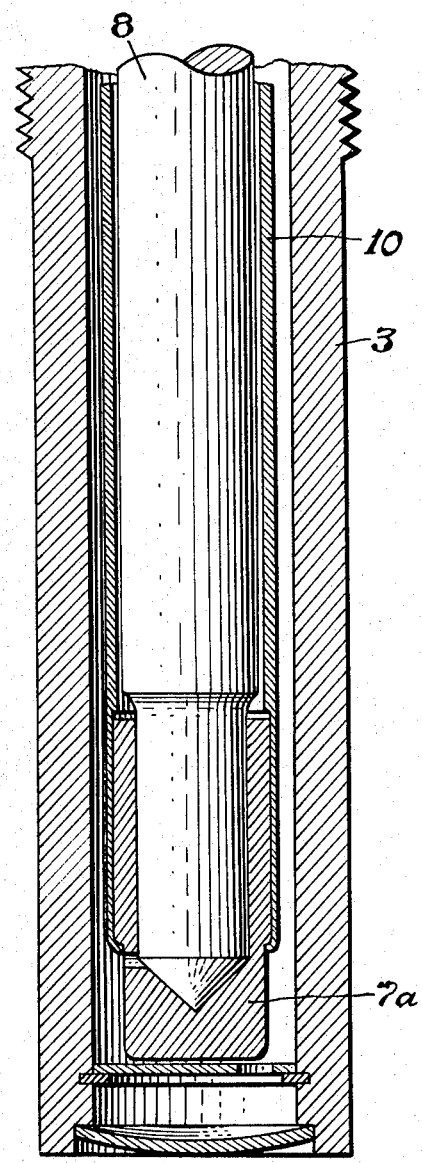

3,298,757
SPINDLE BEARING ARRANGEMENT
FOR A TEXTILE MACHINE
Erwin Friedrich Schmid, Kemnat, Kreis Esslingen, Germany, assignor to SKF Kugellagerfabriken Gesellschaft mit beschrankter Haftung, Stuttgart-Bad Cannstatt, Germany, a company of Germany
Filed Oct. 16, 1964, Ser. No. 404,296
Claims priority, application Germany, Oct. 25, 1963, S 88,021
12 Claims. (Cl. 308—152)

This invention relates to a spindle bearing arrangement for textile machines, particularly spinning and twisting machines.

It is conventional to support the spindles of such machines on a spindle rail for rotation about axes which have at least a major vertical component. A footstep bearing is provided at the lower axial end of the spindle and the spindle projects upward through a collar bearing. The footstep bearing mainly supports the weight of the spindle and of the textile material wound thereon, and the collar bearing has to absorb most of the radial forces caused by asymmetrical loading of the rotating spindle. These forces cause rapid bearing wear if the collar bearing is rigidly fastened to the spindle rail.

It has therefore been proposed to provide a bearing arrangement for spindles on textile machines with collar bearing better equipped to absorb radial forces without wear by being slightly movable relative to the spindle rail. Because of the necessity of maintaining a substantially constant axial spacing between footstep bearing and collar bearing, the known bearing arrangements of this type are relatively complex, and therefore costly. Their cost is further increased by the extensive need for high-strength materials of construction, particularly for the housing which encloses the bearings proper and is attached to the spindle rail.

The primary object of the invention is a bearing arrangement which can be manufactured at low cost while achieving the desired low bearing wear and quiet rotation of the spindle in a well centered position even when the spindle is heavily loaded and rotated at high speed.

Another object is the provision of a bearing arrangement in which the use of expensive high-strength material may be minimized without impairing performance.

With these and other objects in view, the invention in one of its aspects provides a bearing housing for a spindle bearing which mainly consists of a plurality of axially offset tubular members. The housing encloses a collar bearing and supports a footstep bearing in a position axially spaced from the collar bearing. A resilient annular member of non-metallic material is interposed between two of the tubular housing members and is fixedly fastened to respective radial end faces of the two members which are arranged spacedly opposite each other.

Other features and many of the attendant advantages of this invention will be readily appreciated as the same becomes better understood from the following detailed description of preferred embodiments when considered in conjunction with the appended drawings in which:

FIG. 1 is a fragmentary view of a spindle bearing arrangement of the invention in elevational section on the bearing axis;

FIGS. 2 and 3 show modifications of the arrangement of FIG. 1 in corresponding views;

FIG. 4 shows a detail of yet another embodiment of the invention in axially sectional elevational view; and FIG. 5 shows the bottom portion of the spindle bearing arrangment of FIG. 1.

Referring now to the drawing in detail and initially to FIG. 1, there is seen a spindle rail 1 which is formed with a row of uniformly spaced openings 2 of which only one is shown in the drawing, it being understood that the structure illustrated is repeated along the length of the rail 1.

The housing of the illustrated bearing arrangement includes a sleeve 3 of stepped cylindrical shape which is externally threaded and mounted in the opening 2 of the rail 1 by means of a nut 4 and of an internally threaded disk 5, which abut against opposite faces of the rail 1. A centrally apertured cap 3a is coaxially mounted on the sleeve 3 by means of engaging thread. An axially interposed rubber ring 6 connects the radial top face of the cap 3a with the parallel bottom face of a bearing shell 3b which is the axially terminal top member of the housing. The rubber ring 6 is fixedly attached to the opposite radial end faces of the cap 3a and of the shell 3b by being directly vulcanized thereto. The cap 3a and shell 3b are members of the bearing arrangement just as the sleeve 3 and are referred to in the claims as tubular members of the bearing housing means.

The roller bearing 7 is mounted in the shell 3b for rotatably holding a spindle shaft 8 only partly shown in the drawing, and conventional in itself. The upwardly projecting portion of the shaft 8 carries a bell-shaped cover 9 to prevent contamination of the bearing arrangement, and the bottom end of the shaft is supported on a footstep bearing shown in FIG. 5 and designated 7a. The shaft is mounted within a supporting tube 10 within the housing in a known manner. The tube 10 has an annular circumferential groove near its top end. A resilient attaching ring 11 engages the groove in the tube 10 and projects into an annular recess in the cap 3a, the friction between the ring 11 and the cap 3a being sufficient to hold the tube 10 to the cap during assembly or disassembly of the bearing arrangement. In the illustrated assembled condition of the housing, the ring 11 is additionally secured against axial displacement under the weight of the spindle shaft 8 by being clamped between opposite annular faces of the sleeve 3 and of the cap 3a.

The bearing arrangement leaves sufficient space for a brake 14 known in itself, and not directly relevant to this invention.

In the modified bearing arrangement of the invention illustrated in FIG. 2, the housing portion visible in the drawing consists of two axially offset members, a sleeve 15 and a bearing shell 16, which have integral flanges with parallel, spacedly opposite, radial end faces. A rubber ring 6 which is vulcanized to these end faces resiliently connects the two housing members 15, 16.

The sleeve 15 is fixedly fastened in an opening 2 of a spindle rail 1 by a nut 4 and a disk 5, as has been described with reference to FIG. 1, and the bearing shell 16 encloses the collar bearing 7 in which the spindle shaft 8 is rotatably mounted, a cover 9 being attached to the shaft 8.

In the absence of two threadably connected housing members, the tube 10 which supports the non-illustrated footstep bearing is held in position in the sleeve 15 by a ring 11 which engages a groove in the tube and rests on an internal shoulder of the sleeve 15 under the weight of the spindle shaft 8. If so desired, fastening means for preventing upward displacement of the ring 11 may be provided, but are not usually required.

The bearing arrangement shown in FIG. 3 includes a sleeve 15' closely similar to the sleeve 15 shown in FIG. 2 but lacking the afore-mentioned internal shoulder not required in this arrangement for holding the supporting tube 17 of the non-illustrated footstep bearing. The sleeve 15' is normally fixedly attached to the spindle rail 1, and connected to a bearing shell 18 by means of a vulcanized rubber ring 6. The shell 18 encloses the collar bearing 7 and is provided with an annular recess closely adjacent the bearing 7. An integral flange 12 on the supporting tube 17 engages the recess and is thereby axially secured in the housing.

The bearing illustrated in FIG. 3 may be further modified in a manner evident from FIG. 1 by replacing the sleeve 15' by two threadedly connected coaxial tubular elements substantially identical with the sleeve 3 and the cap 3a, the latter being fastened to the bearing shell 18 by the rubber ring 6. In the modified structure, the shell 18, the ring 6, and the upper threadedly secured portion of the sleeve 15' may be removed as a unit with both bearings from the remaining portion of the sleeve which is fixedly attached to the spindle rail. Such a mode of operation is also possible with the bearing arrangement shown in FIG. 1 as has been described hereinbefore.

As shown in FIG. 4, the housing portion 19 which is fixedly mounted on the spindle rail 1 may be connected with the bottom portion 20 of the housing by a vulcanized rubber ring 21, and such an arrangement is preferred where relative radial movement of the housing and the footstep bearing is to be damped by a coil of sheet material 13 interposed between the supporting tube 10' and the lower terminal housing portion 20. The upper end of the bearing arrangement is not shown in FIG. 4, but may be the same as shown in any one of FIGS. 1 to 3.

The resilient rubber ring 6 and the corresponding ring 21 may be replaced by rings of other resilient materials without altering the mode of operation of the bearing arrangement. The rings, whether made of rubber, other elastomers, or non-metallic material which is not strictly definable as an elastomer, may be secured to the radial end faces of the connected housing portions by adhesive bonding or in any other manner which provides a fixed connection between the abuttingly engaged rigid and resilient housing elements while permitting elastic deformation of the ring body.

A substantially parallel alignment of the spaced opposite end faces of the rigid housing elements connected by a resilient ring is preferred because the radial deviation of the shaft axis from the geometrical axis of the bearing arrangement remains uniform during rotation of the spindle shaft with such alignment. It is also preferred to arrange the resilient ring as close to the collar bearing as is possible because the stresses on the bearing are inversely related to the distance between collar bearing and resilient ring, and the footstep bearing deviates least from a center position during rotation of an unbalanced spindle when the resilient ring is very close to the collar bearing.

Only the bearing shells of the several embodiments of the invention are subject to relatively high stresses during operation of the bearing arrangement, and are preferably made of high strength alloy material. The portions of the housing connected to the bearing shell by a resilient ring may be made of weaker, and therefore less costly material.

It should be understood, of course, that the foregoing disclosures relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A bearing arrangement for spindles of a textile machine, comprising, in combination:
   (a) a stationary support;
   (b) a plurality of individual tubular members arranged to extend coaxially, each of a first and second of said tubular members having a radially extending end face, the two end faces being opposite and spaced from each other, said plurality of tubular members forming together bearing housing means;
   (c) fastening means rigidly fastening said first tubular member to said support;
   (d) a collar bearing coaxially arranged in said second tubular member;
   (e) a resilient non-metallic annular member interposed between said first and second tubular members and fixedly fastened to and across said end faces, said resilient member primarily extending in radial direction; and
   (f) supporting means for supporting a footstep bearing in a position axially spaced from said collar bearing in a direction from said second toward said first tubular member, said supporting means being mounted on one of said first and second tubular members.

2. An arrangement as set forth in claim 1, wherein said supporting means are mounted on said second tubular member.

3. An arrangement as set forth in claim 1, wherein said first tubular member has a second radially extending end face spaced from said first mentioned face thereof in a direction away from said second member, the arrangement further comprising another resilient annular member axially interposed between said second end face and a third one of said tubular members in fixedly fastened relationship, said first, second, and third tubular members being substantially coaxial, said supporting means including a supporting tube axially extending from said one of said first and second tubular members toward said third member and being at least partly axially coextensive with the latter, and damping means interposed between said supporting tube and said third tubular member.

4. A spindle bearing arrangement for a textile machine, comprising
   (a) a plurality of individual tubular members arranged to extend coaxially, each of two adjacent but spaced members of said tubular members having a radially extending end face, the two end faces being opposite and spaced from each other, said tubular members forming together bearing housing means,
   (b) a collar bearing,
   (c) a footstep bearing,
   (d) supporting means for supporting said footstep bearing within said bearing housing means in a position axially spaced from said collar bearing, said bearings supporting a spindle and being enclosed by said bearing housing means,
   (e) a resilient annular member of non-metallic material interposed between and fixedly fastened to and across said two end faces, said resilient member extending primarily in radial direction, and
   (f) a stationery support, one of said tubular members being rigidly secured to said stationary support.

5. A spindle bearing arrangement for a textile machine, comprising
   (a) bearing housing means having an axis and including three tubular members,
   (b) a collar bearing and a footstep bearing within said bearing housing means,
   (c) supporting means for supporting said footstep bearing in a position axially spaced from said collar bearing,
   (d) a spindle rail, and
   (e) a resilient annular member of non-metallic material interposed between two of said three tubular members, each of said two members having a radially extending end face, said two end faces being opposite and spaced from each other, said two members being secured to each other by said resilient annular member and carrying said collar bearing, and the third tubular member being releasably attached to one of said two members, the arrangement further comprising fastening means for fastening said third member to said spindle rail.

6. A spindle bearing arrangement for a textile machine, comprising
(a) a stationary support,
(b) bearing housing means having an axis and including a plurality of axially offset tubular members having respective radially extending end faces,
(c) fastening means fixedly fastening a first one of said tubular members to said support,
(d) a collar bearing coaxially arranged in a second one of said second tubular members,
(e) a resilient annular member interposed between said first and second tubular members and fixedly fastened to the respective radially extending end faces thereof, said end faces being arranged spacedly opposite each other, and
(f) supporting means for supporting a footstep bearing in a position axially spaced from said collar bearing in a direction from said second toward said first tubular member, said supporting means being mounted on one of said first and second tubular members, said first tubular member having two axially offset parts releasably secured to each other, one of said parts being fixedly fastened to said resilient member, and the other part being fixedly fastened to said support by said fastening means.

7. An arrangement as set forth in claim 4, wherein said two end faces are parallel.

8. An arrangement as set forth in claim 4, wherein said tubular members include an axially terminal member and another member axially adjacent said terminal member, said terminal member and said adjacent member constituting said two members, and said supporting means including means for supporting a footstep bearing coaxial with said collar bearing in an axial position spaced from said other member and said collar bearing.

9. An arrangement as set forth in claim 4, wherein said supporting means include a supporting tube substantially coaxially arranged in said housing means, and fastening means for fixedly fastening said tube to one of said tubular members spaced from said resilient annular member in a direction away from said position of said footstep bearing.

10. An arrangement as set forth in claim 5, further comprising attaching means attaching said supporting means to one of said two members, whereby said collar bearing and a footstep bearing supported by said supporting means may be released from said third tubular member while the same is fastened to a spindle rail by said fastening means.

11. An arrangement as set forth in claim 6, wherein said supporting means are mounted on said other part of said first tubular member.

12. An arrangement as set forth in claim 6, wherein said two parts are threaded and threadedly engage each other, each of said parts having an annular face moving toward and away from an annular face of the other part when said parts threadedly move relative to each other, a portion of said supporting means being interposed between said annular faces.

References Cited by the Examiner

UNITED STATES PATENTS 3,049,860  8/1962  Beerli _____ 57—135

FOREIGN PATENTS 734,972  8/1955  Great Britain.

MARTIN P. SCHWADRON, *Primary Examiner.*

FRANK SUSKO, *Examiner.*

DAVID J. WILLIAMOWSKY, EDGAR W. GEOGHEGAN, *Assistant Examiners.*